US010838520B2

(12) United States Patent
Nakayama et al.

(10) Patent No.: US 10,838,520 B2
(45) Date of Patent: Nov. 17, 2020

(54) HANDWRITING INPUT DEVICE

(71) Applicant: MITSUBISHI PENCIL COMPANY, LIMITED, Tokyo (JP)

(72) Inventors: Kyo Nakayama, Yokohama (JP); Yusuke Koizumi, Yokohama (JP); Masaya Yamada, Yokohama (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/329,334

(22) PCT Filed: Aug. 29, 2017

(86) PCT No.: PCT/JP2017/030945
§ 371 (c)(1),
(2) Date: Feb. 28, 2019

(87) PCT Pub. No.: WO2018/043488
PCT Pub. Date: Mar. 8, 2018

(65) Prior Publication Data
US 2019/0227644 A1    Jul. 25, 2019

(30) Foreign Application Priority Data

Sep. 2, 2016  (JP) ................. 2016-171892
Sep. 2, 2016  (JP) ................. 2016-171893
Dec. 20, 2016 (JP) ................. 2016-246405

(51) Int. Cl.
*G06F 3/0354* (2013.01)
*G06F 3/03* (2006.01)
(Continued)

(52) U.S. Cl.
CPC ............ *G06F 3/03545* (2013.01); *G06F 3/03* (2013.01); *G06F 3/046* (2013.01); *G06F 3/0414* (2013.01);
(Continued)

(58) Field of Classification Search
CPC ...... G06F 3/03; G06F 3/03545; G06F 3/0414; G06F 3/04162; G06F 3/046; G06F 3/04883
See application file for complete search history.

(56) References Cited

U.S. PATENT DOCUMENTS 4,697,050 A   9/1987 Farel et al.
5,629,499 A   5/1997 Flickinger et al.
(Continued)

FOREIGN PATENT DOCUMENTS

EP   0772149 A1   5/1997
EP   3022623 A1   5/2016
(Continued)

OTHER PUBLICATIONS

International Search Report dated Oct. 17, 2017, issued in counterpart International Application No. PCT/JP2017/030945 (2 pages).
(Continued)

*Primary Examiner* — Nelson M Rosario
(74) *Attorney, Agent, or Firm* — Westerman, Hattori, Daniels & Adrian, LLP

(57) ABSTRACT

A handwriting input device configured to obtain handwritten data of an electronic pen on a coordinate detection surface of a coordinate input device by an electromagnetic induction effect of the coordinate input device and the electronic pen. The electronic pen includes a first resonance circuit including a coil, a capacitor, and a core, a mechanical pencil unit configured to perform writing on a paper sheet placed on the coordinate detection surface, and a writing pressure detecting portion configured to detect a writing pressure such that a part of the mechanical pencil unit is pushed by receiving the writing pressure applied to a lead projecting from a distal end of the mechanical pencil unit. The detection of the writing pressure causes the coordinate input device to obtain the hand-written data corresponding (Continued)

to a handwriting on the paper sheet while writing is performed on the paper sheet with the electronic pen.

7 Claims, 12 Drawing Sheets

(51) Int. Cl.
G06F 3/0488 (2013.01)
G06F 3/041 (2006.01)
G06F 3/046 (2006.01)

(52) U.S. Cl.
CPC ...... *G06F 3/04162* (2019.05); *G06F 3/04883* (2013.01)

(56) References Cited

U.S. PATENT DOCUMENTS

| | | | |
|---|---|---|---|
| 5,633,471 A | | 5/1997 | Fukushima |
| 2009/0076770 A1* | | 3/2009 | Fukushima .......... G06F 3/03545 702/150 |
| 2010/0177063 A1* | | 7/2010 | Altman ............... G06F 3/03545 345/179 |
| 2014/0362011 A1* | | 12/2014 | Niwa ...................... B42F 9/002 345/173 |
| 2016/0085356 A1 | | 3/2016 | Stern |
| 2016/0125225 A1 | | 5/2016 | Ebihara et al. |
| 2016/0154485 A1* | | 6/2016 | Kampt ................ G06F 3/03545 345/179 |
| 2017/0341458 A1 | | 11/2017 | Kaneda et al. |
| 2019/0179436 A1* | | 6/2019 | Kake .................... G06F 3/0488 |

FOREIGN PATENT DOCUMENTS

| | | |
|---|---|---|
| JP | S61-46515 A | 3/1986 |
| JP | 7-200134 A | 8/1995 |
| JP | 8-194574 A | 7/1996 |
| JP | 9-128131 A | 5/1997 |
| JP | 2717774 B2 | 2/1998 |
| JP | 2007-219723 A | 8/2007 |
| JP | 4119174 B2 | 7/2008 |
| JP | 2010-271830 A | 12/2010 |
| WO | 2016-121478 A1 | 8/2016 |

OTHER PUBLICATIONS

European Search Report dated Jul. 16, 2020, issued in counterpart application No. 17846493.9. (15 pages).
Extended (Supplementary) European Search Report dated Sep. 29, 2020, issued in counterpart application No. 17846493.9 (15 pages).

* cited by examiner

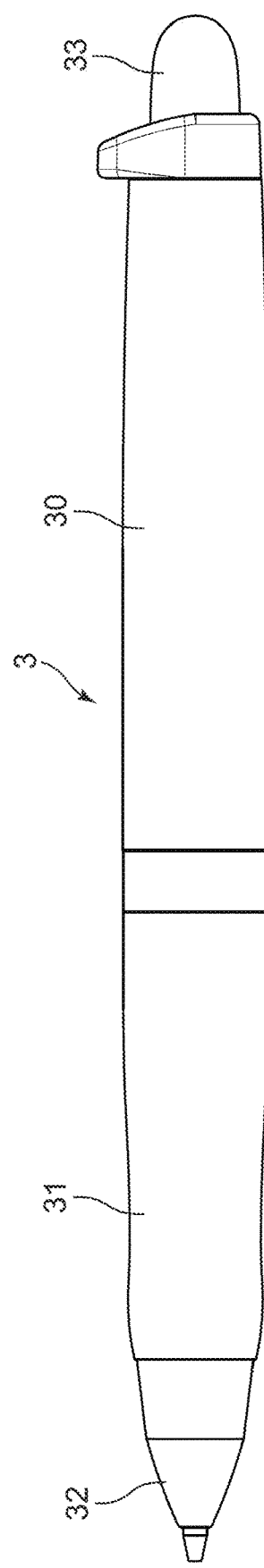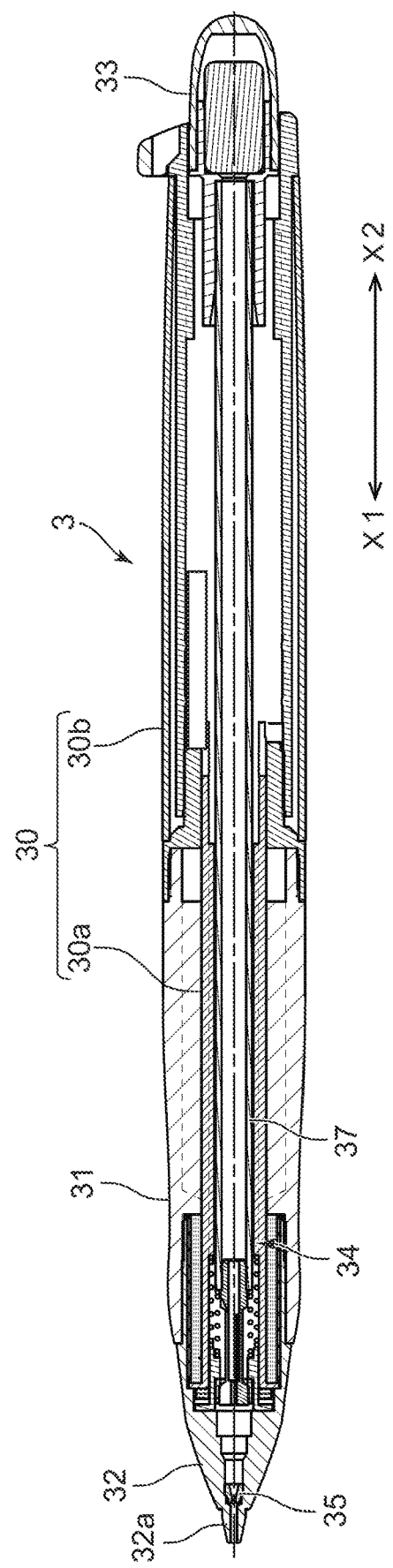
FIG. 3A
FIG. 3B

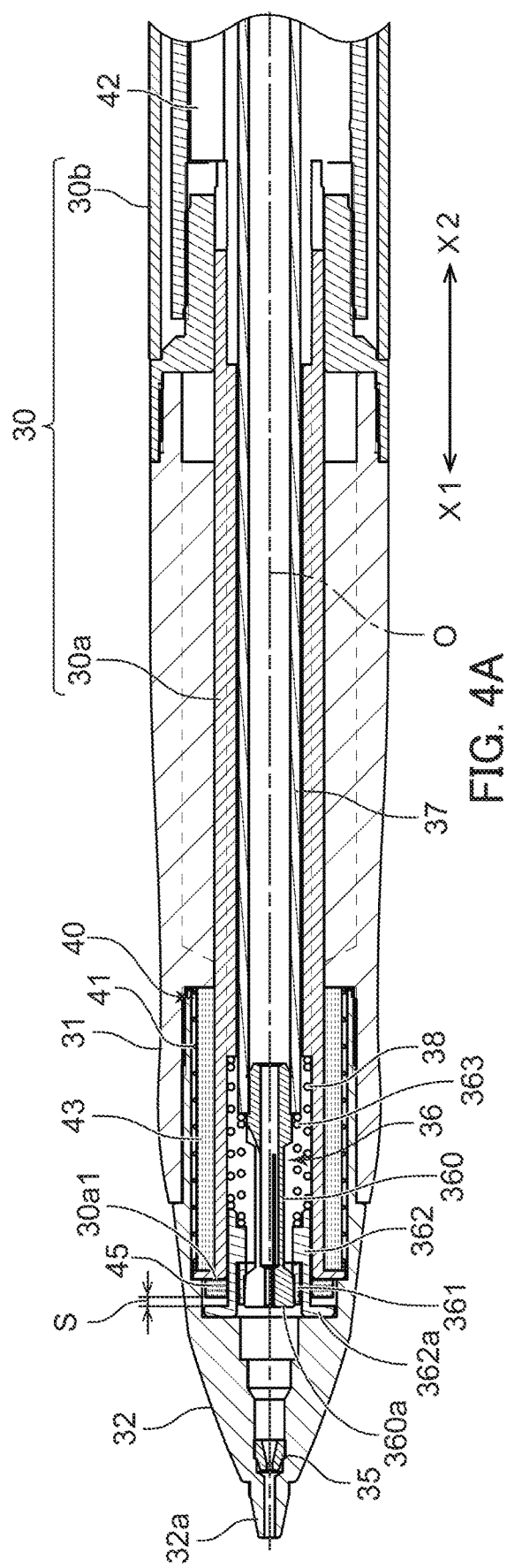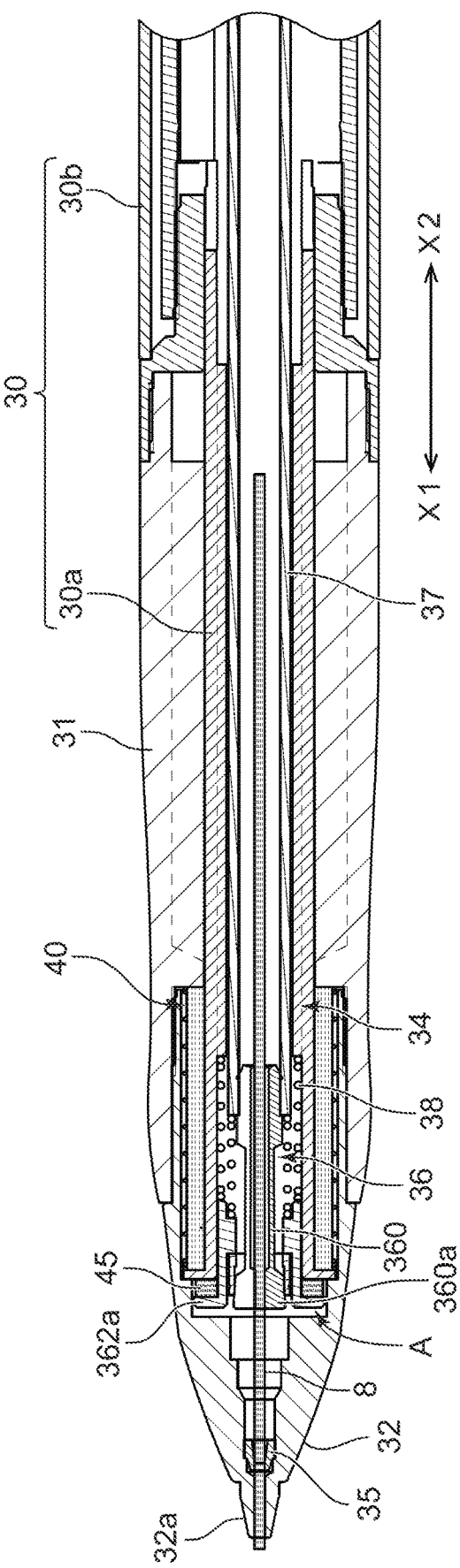
FIG. 4A
FIG. 4B

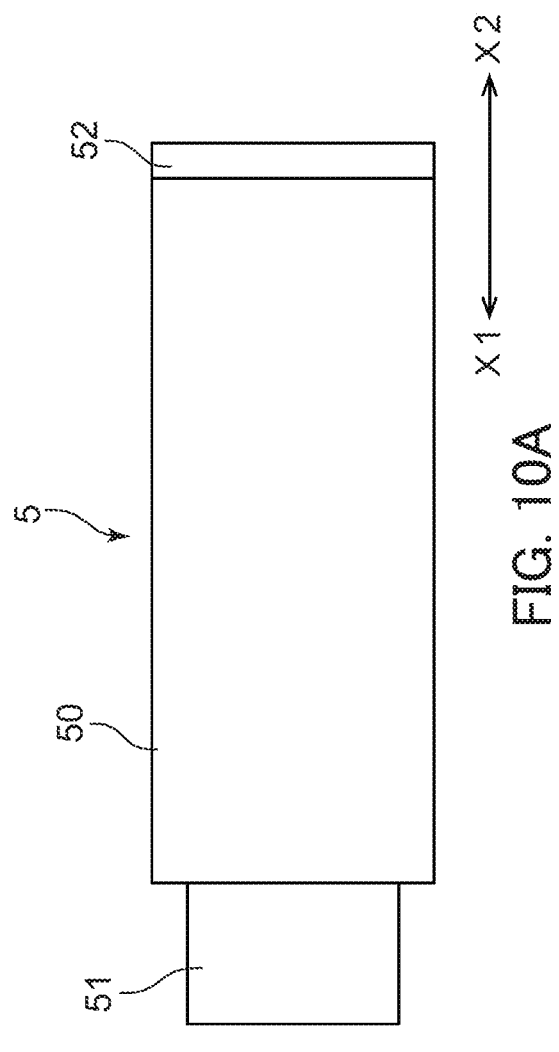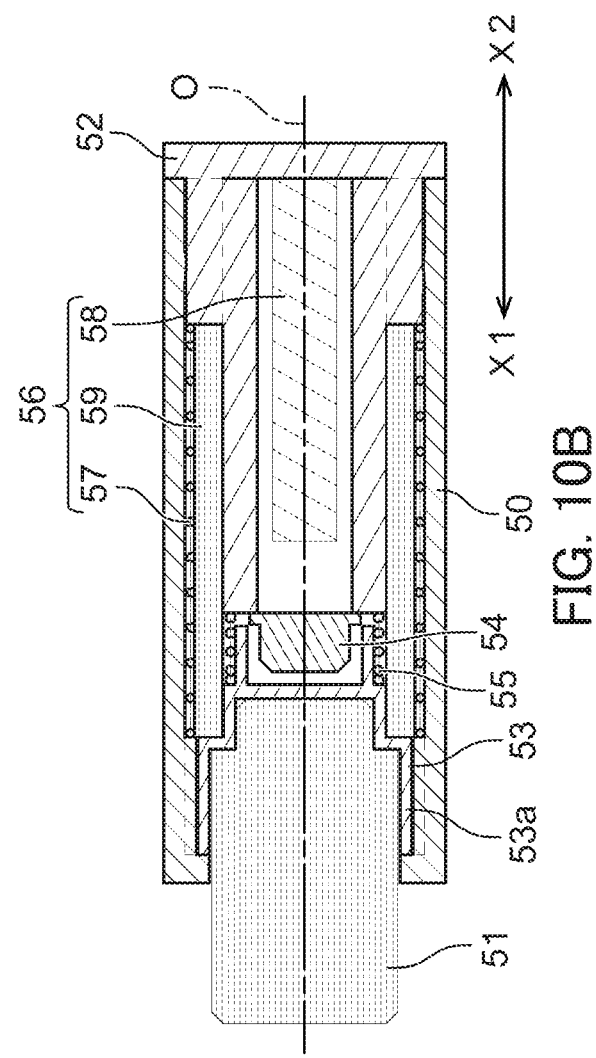

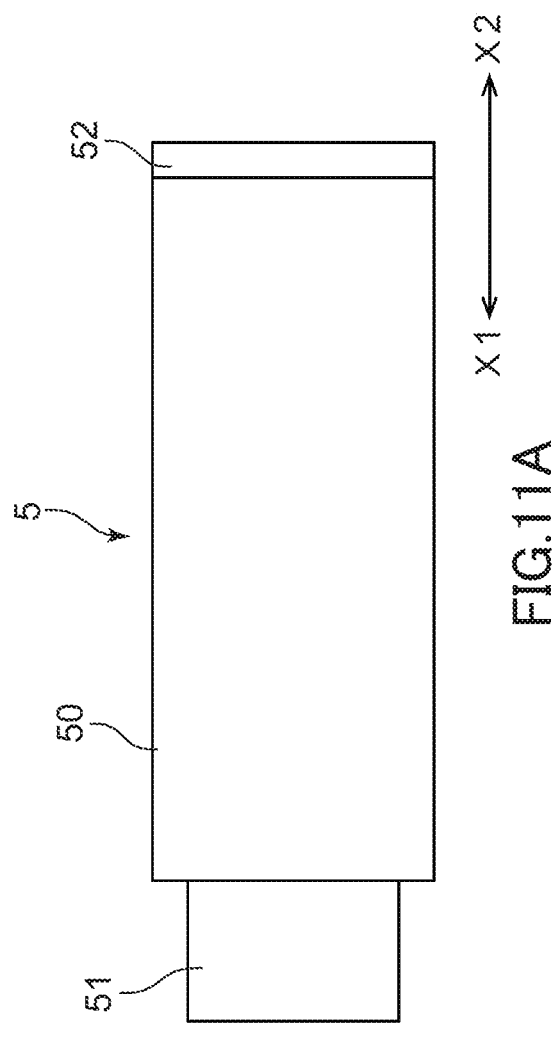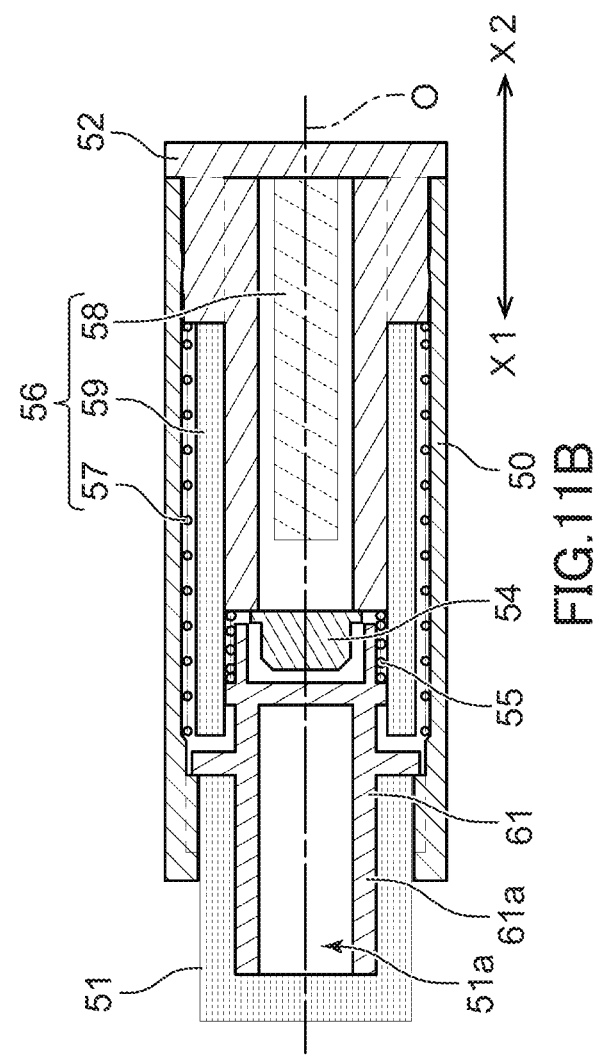

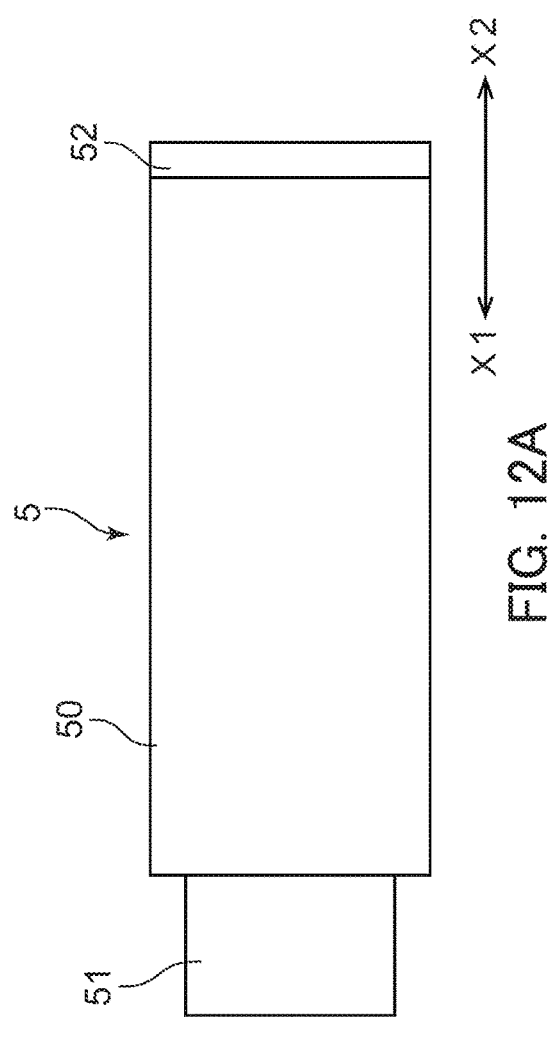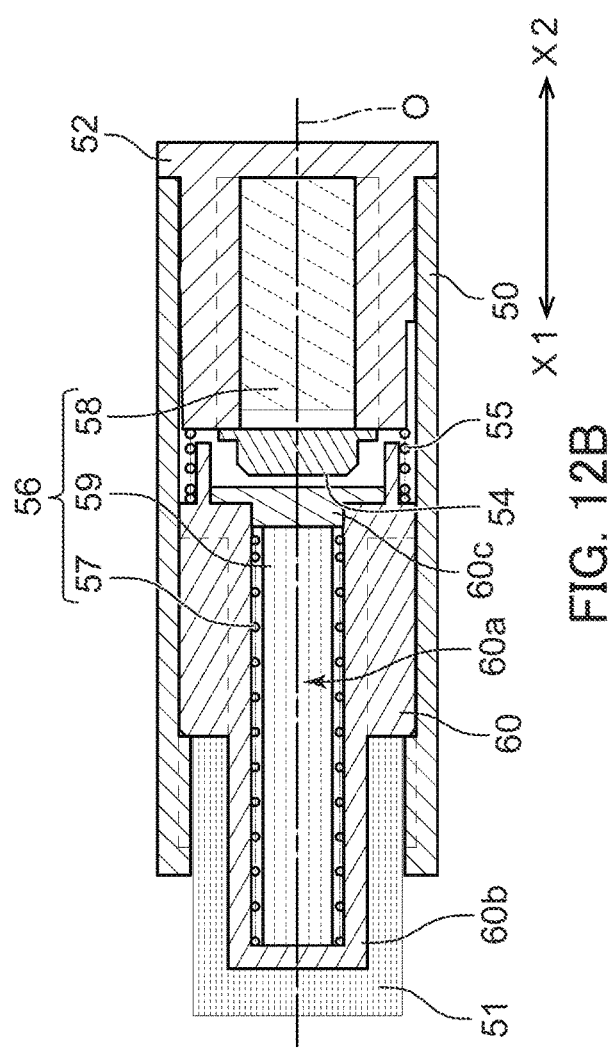

HANDWRITING INPUT DEVICE

TECHNICAL FIELD

The present invention relates to a handwriting input device that includes a coordinate input device and an electronic pen and uses a coordinate detection method by an electromagnetic induction effect.

BACKGROUND ART

Recently, the following handwriting input device has been known. The handwriting input device is configured to simultaneously perform writing on a paper sheet and input to a coordinate input device by providing a writing unit to an electronic pen to use it while the paper sheet is placed on a coordinate detection surface of the coordinate input device.

Following Patent Document 1 and Patent Document 2 disclose structures of electronic pens including writing units.

CITATION LIST

Patent Document

Patent Document 1: Japanese Patent No. 2717774
Patent Document 2: Japanese Patent No. 4119174

DISCLOSURE OF THE INVENTION

Problems to be Solved by the Invention

The electronic pens disclosed in Patent Document 1 and Patent Document 2 each include a writing pressure detection function. Here, the electronic pens described in Patent Document 1 and Patent Document 2 have a configuration where the whole writing unit, when receiving a writing pressure, retreats by receiving a pressing force. In view of this, even in a state where a lead does not project from a nib, the writing pressure is detected when the writing unit receives the pressing force. Accordingly, though the writing is not performed on a paper sheet in practice (though no writing is performed on the paper sheet), an incorrect input that obtains hand-written data occurs on a side of the coordinate input device.

The present invention has been made in consideration of such a problem, and one of its objectives is to provide a handwriting input device that can reduce an incorrect input.

Solutions to the Problems

A handwriting input device of the present invention is a handwriting input device configured to obtain hand-written data of an electronic pen on a coordinate detection surface of a coordinate input device by an electromagnetic induction effect of the coordinate input device and the electronic pen. The electronic pen includes a resonance circuit including a coil, a capacitor, and a core, a mechanical pencil unit configured to perform writing on a paper sheet placed on the coordinate detection surface, and a writing pressure detecting portion configured to detect a writing pressure such that a part of the mechanical pencil unit is pushed by receiving the writing pressure applied to a lead projecting from a distal end of the mechanical pencil unit. The detection of the writing pressure causes the coordinate input device to obtain the hand-written data corresponding to a handwriting on the paper sheet while writing is performed on the paper sheet with the electronic pen.

According to the above-described handwriting input device, the following is preferable. The electronic pen internally includes a lead deliver portion configured to advance and retreat. The lead deliver portion is configured to deliver the lead from the distal end of the mechanical pencil unit. The lead deliver portion is configured to axially retreat together with the lead by receiving the writing pressure in a state where the lead is projecting from the distal end of the mechanical pencil unit. The writing pressure detecting portion acts in response to a movement of the lead deliver portion with the writing pressure.

According to the above-described handwriting input device, the following is preferable. The electronic pen internally and fixedly arranges a pipe shaped shaft tube. The lead deliver portion is inserted into a distal end side of the shaft tube. The lead deliver portion includes a flange opposed to a distal end surface of the shaft tube ahead of the distal end surface. The writing pressure detecting portion is disposed on one of the flange and the distal end surface. The writing pressure detecting portion is pushed by the distal end surface or the flange to detect the writing pressure.

According to the above-described handwriting input device, the following is preferable. A buffer is arranged on a part of a peripheral area of the lead deliver portion.

According to the above-described handwriting input device, the following is preferable. The lead deliver portion has a movement amount with the writing pressure. The movement amount is 0 mm or more and 0.5 mm or less.

According to the above-described handwriting input device, the following is preferable. The writing pressure detecting portion is configured from a pressure-sensitive sensor.

According to the above-described handwriting input device, the following is preferable. The coordinate input device includes a fixing portion that fixes the paper sheet onto the coordinate detection surface. A presence/absence of the paper sheet is detectable on the fixing portion. Obtaining of the hand-written data is stopped when the paper sheet is determined to be absent.

According to the above-described handwriting input device, the following is preferable. The coordinate input device includes a positional-deviation detecting portion that detects whether the paper sheet is arranged at a predetermined position on the coordinate detection surface or not. Obtaining of the hand-written data is stopped when the positional-deviation detecting portion determines that the paper sheet is not arranged on the predetermined position.

Effects of the Invention

The present invention can reduce the incorrect input such that the hand-written data is obtained on the coordinate input device side though the writing is not performed on the paper sheet, thus improving a consistency between the handwriting written on the paper sheet and the hand-written data obtained by the coordinate input device.

BRIEF DESCRIPTION OF THE DRAWINGS

FIG. 3A is a plan view of an electronic pen in the embodiment, and FIG. 3B is a cross-sectional view of the electronic pen illustrated in FIG. 3A.

FIG. 4A is a partially enlarged cross-sectional view of the electronic pen in the embodiment in a non-writing state, and FIG. 4B is a partially enlarged cross-sectional view of the electronic pen in the embodiment in a state where a writing pressure is applied to a lead.

FIG. 10A is a plan view of an electronic eraser in the embodiment, and FIG. 10B is a cross-sectional view of the electronic eraser illustrated in FIG. 10A.

FIG. 11A is a plan view of an electronic eraser in an embodiment different from that in FIG. 10, and FIG. 11B is a cross-sectional view of the electronic eraser illustrated in FIG. 11A.

FIG. 12A is a plan view of an electronic eraser in an embodiment different from those in FIG. 10 and FIG. 11, and FIG. 12B is a cross-sectional view of the electronic eraser illustrated in FIG. 12A.

DESCRIPTION OF PREFERRED EMBODIMENTS

Figure 1:
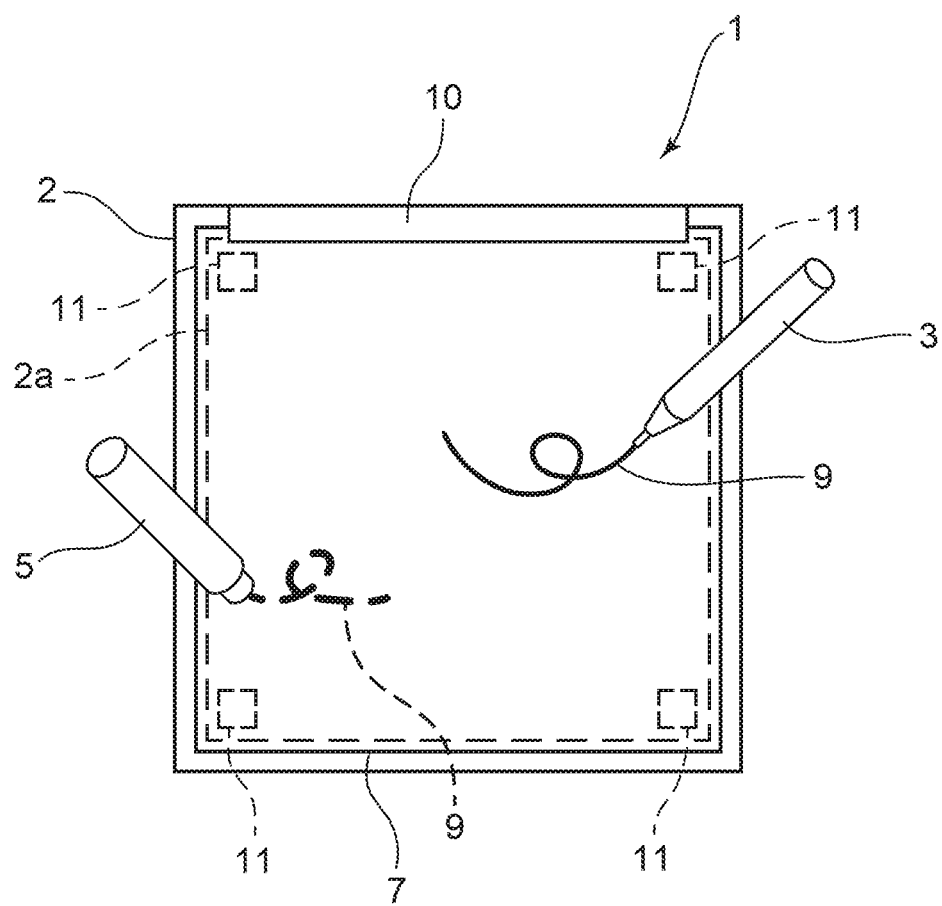
FIG. 1 is a schematic diagram of a handwriting input device in an embodiment.
Figure 2:
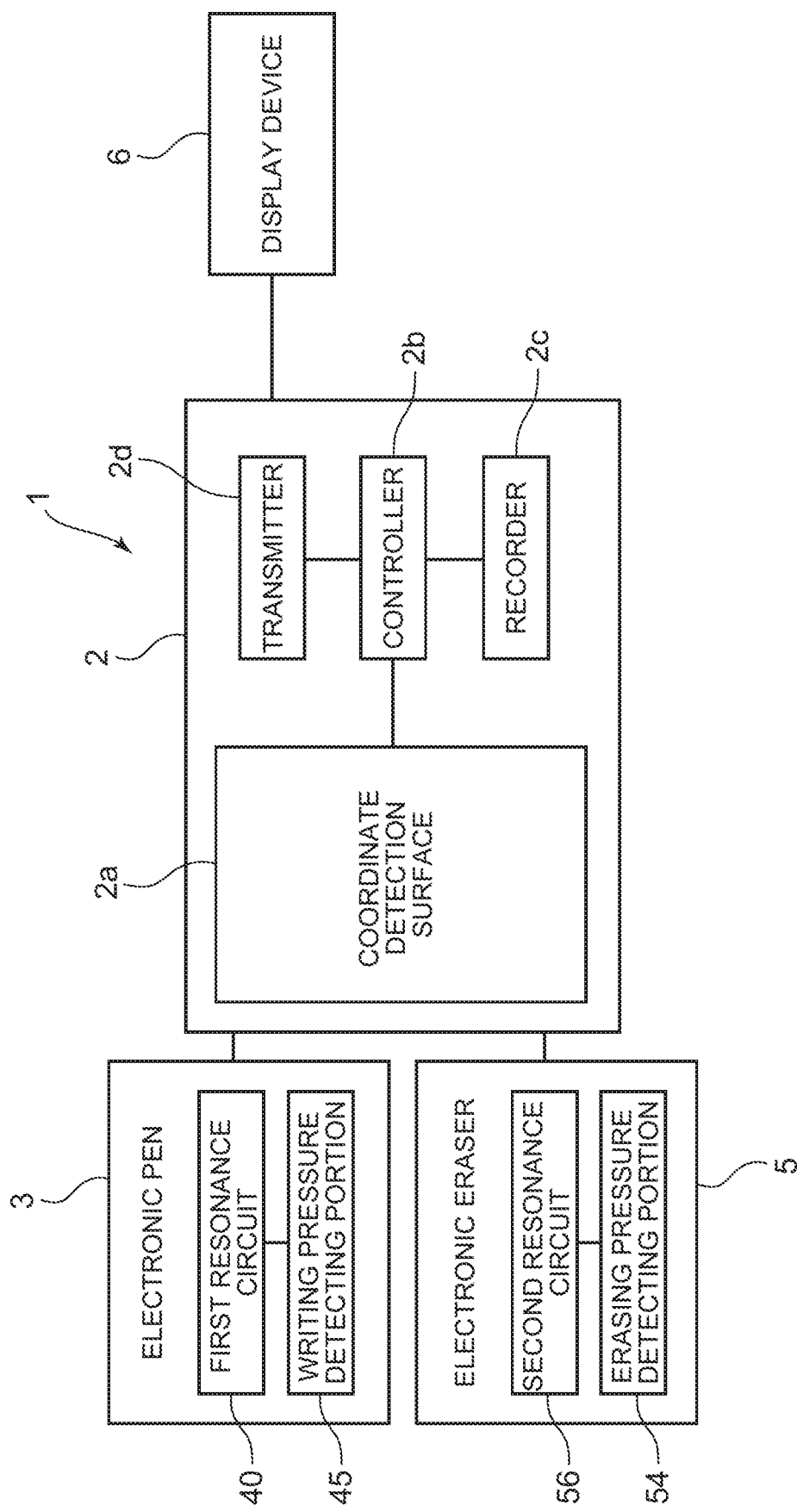
FIG. 2 is a block diagram of the handwriting input device in the embodiment.
Figure 5:
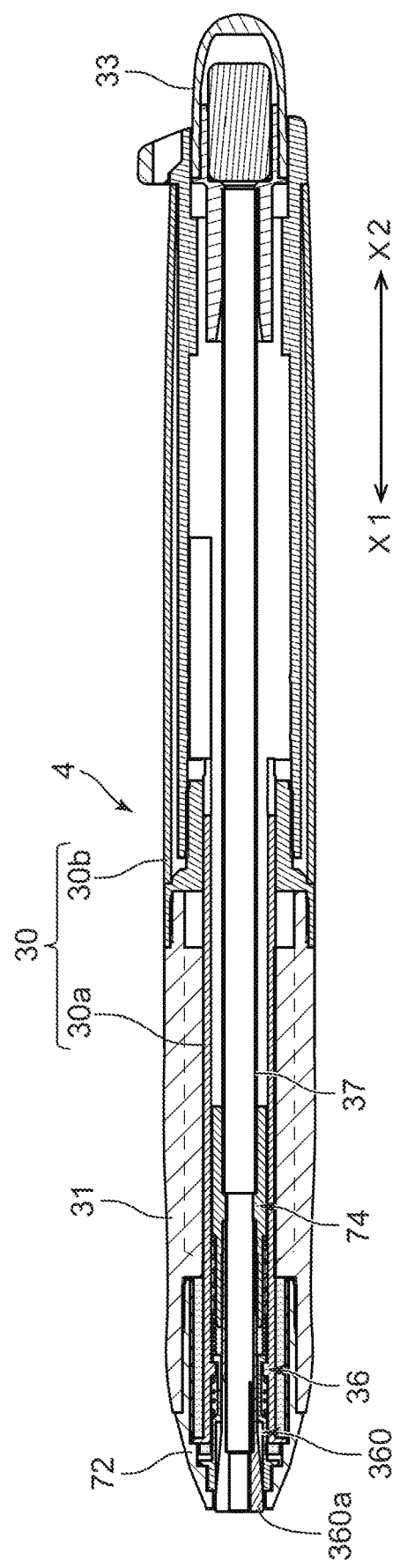
FIG. 5 is a cross-sectional view of an electronic pen illustrating a non-writing state in an embodiment different from that in FIG. 3.
Figure 6:
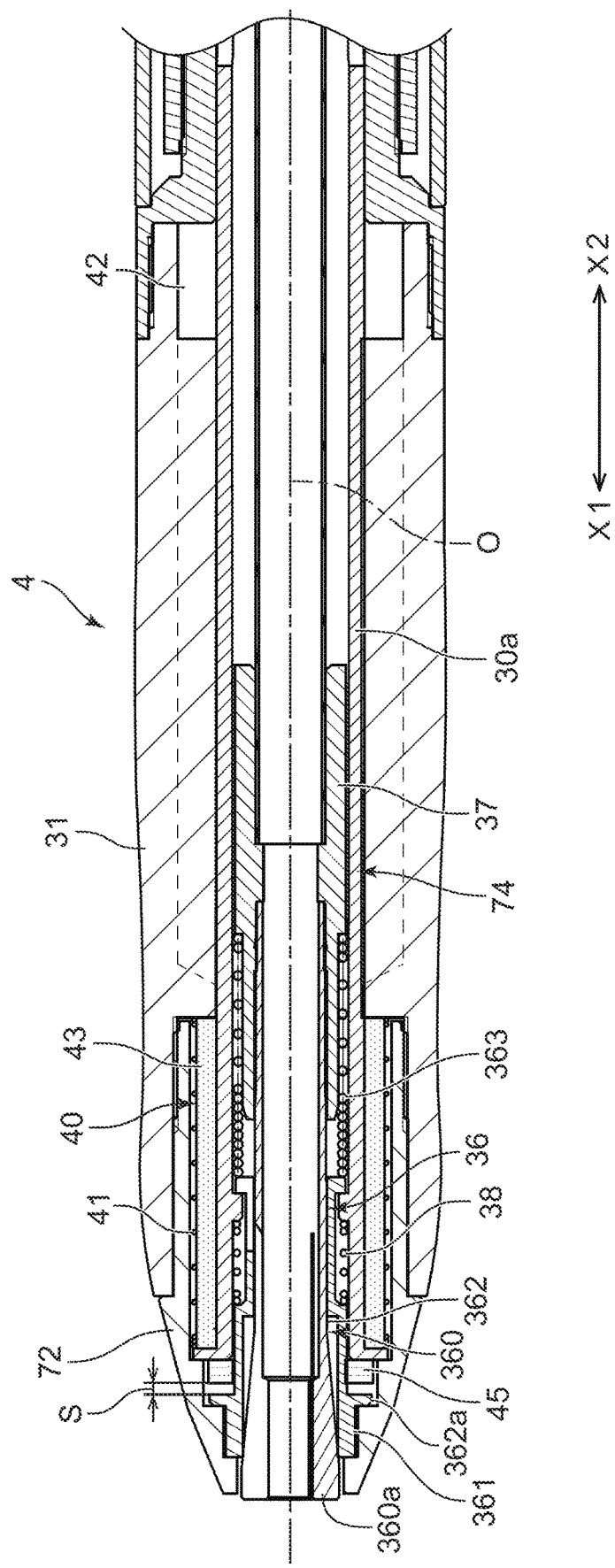
FIG. 6 is a partially enlarged cross-sectional view of the electronic pen illustrated in FIG. 5.
Figure 7:
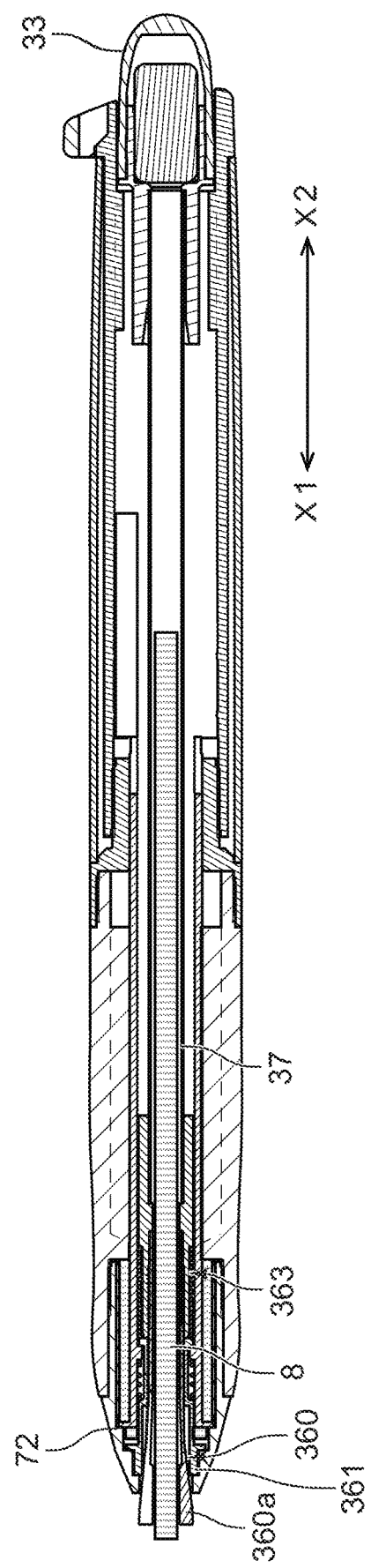
FIG. 7 is a cross-sectional view illustrating a state where the lead is sent out by clicking the electronic pen in FIG. 5.
Figure 8:
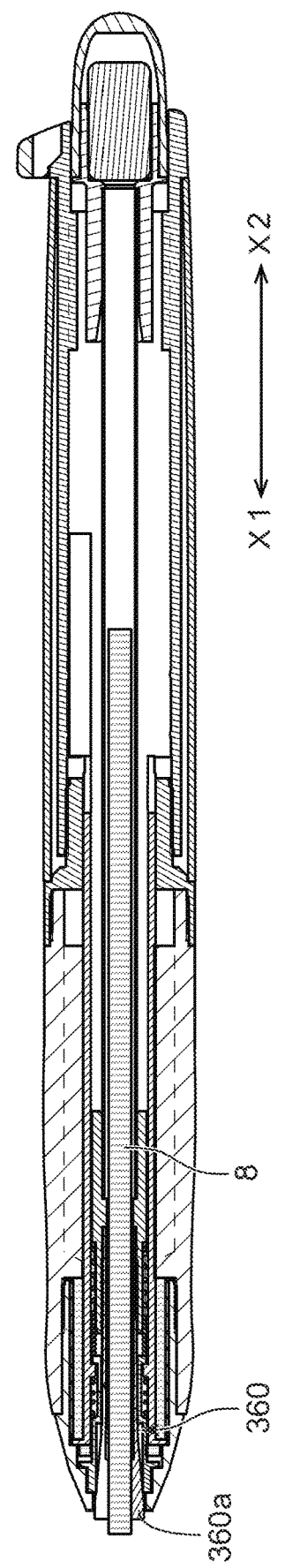
FIG. 8 is a cross-sectional view illustrating a writing state of the electronic pen illustrated in FIG. 5.
Figure 9:
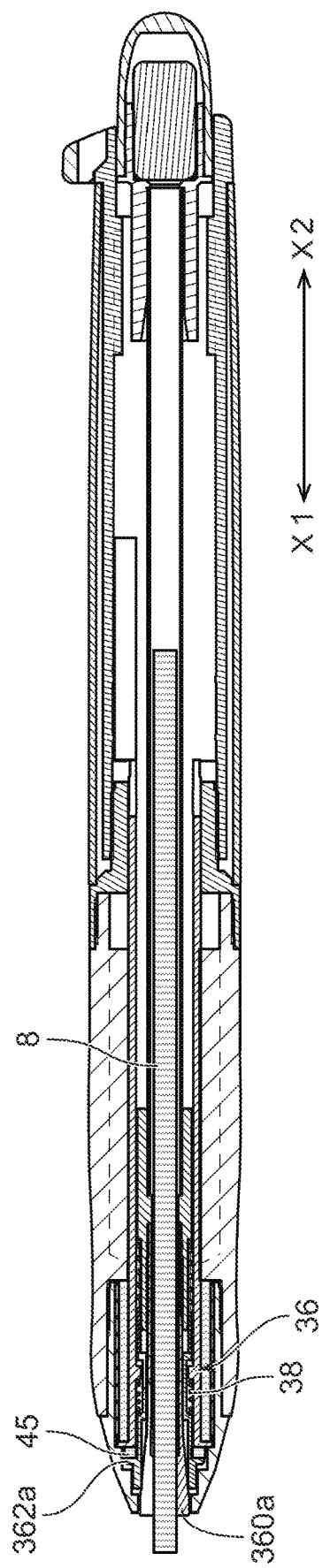
FIG. 9 is a cross-sectional view illustrating a state where the writing pressure is applied to the lead in the electronic pen in FIG. 5.

The following describes embodiments of the present invention in detail with reference to the attached drawings. FIG. 1 is a schematic diagram of a handwriting input device in an embodiment. FIG. 2 is a block diagram of the handwriting input device in the embodiment. FIG. 3A is a plan view of an electronic pen in the embodiment, and FIG. 3B is a cross-sectional view of the electronic pen illustrated in FIG. 3A. FIG. 4A is a partially enlarged cross-sectional view of the electronic pen in the embodiment in a non-writing state, and FIG. 4B is a partially enlarged cross-sectional view of the electronic pen in the embodiment in a state where a writing pressure is applied to a lead. FIG. 5 is a cross-sectional view of an electronic pen illustrating a non-writing state in an embodiment different from that in FIG. 3. FIG. 6 is a partially enlarged cross-sectional view of the electronic pen illustrated in FIG. 5. FIG. 7 is a cross-sectional view illustrating a state where the lead is sent out by clicking the electronic pen in FIG. 5. FIG. 8 is a cross-sectional view illustrating a writing state of the electronic pen illustrated in FIG. 5. FIG. 9 is a cross-sectional view illustrating a state where the writing pressure is applied to the lead in the electronic pen in FIG. 5. FIG. 10A is a plan view of an electronic eraser in the embodiment, and FIG. 10B is a cross-sectional view of the electronic eraser illustrated in FIG. 10A. FIG. 11A is a plan view of an electronic eraser in an embodiment different from that in FIG. 10, and FIG. 11B is a cross-sectional view of the electronic eraser illustrated in FIG. 11A. FIG. 12A is a plan view of an electronic eraser in an embodiment different from those in FIG. 10 and FIG. 11, and FIG. 12B is a cross-sectional view of the electronic eraser illustrated in FIG. 12A.

In this description, "writing" means to write a character, painting, and the like on a paper sheet with a lead of a mechanical pencil, and "handwriting" means one written on a paper sheet 7 such as the character and the painting. In an electronic pen 3, 4, "front" means a side (X1 side) where the lead projects from a distal end, and "rear" means its opposite side (X2 side). In an electronic eraser 5, "front" means a side (X1 side) where an eraser 51 exists to erase the character and the like written on the paper sheet 7, and "rear" means its opposite side (X2 side).

As illustrated in FIG. 1, a handwriting input device 1 is configured including a coordinate input device 2, the electronic pen 3, and the electronic eraser 5.

The handwriting input device 1 illustrated in FIG. 1 is an electromagnetic induction method digitizer configured to obtain respective coordinate data (input position information) of the electronic pen 3 and the electronic eraser 5 on a coordinate detection surface 2a (see FIG. 1 and FIG. 2) of the coordinate input device 2 by an electromagnetic induction effect between the coordinate input device 2, and the electronic pen 3 and the electronic eraser 5.

(Coordinate Input Device)

The coordinate input device 2 is a digitizer main body including the coordinate detection surface 2a. A plurality of antenna coils (not illustrated) are arranged side by side in two-dimensional directions that are mutually orthogonal inside the coordinate detection surface 2a. The coordinate input device 2 scans the coordinate detection surface 2a by sequentially switching the antenna coils. At this time, an antenna coil closest to the electronic pen 3 generates the strongest signal on the coordinate detection surface 2a. The coordinate input device 2 includes a controller 2b illustrated in FIG. 2 that is configured to calculate the coordinate data on the coordinate detection surface 2a of the electronic pen 3 based on this signal. Similarly, the controller 2b illustrated in FIG. 2 is configured to calculate the coordinate data on the coordinate detection surface 2a of the electronic eraser 5.

The coordinate data calculated by the controller 2b is recorded by a recorder 2c illustrated in FIG. 2. A transmitter 2d is configured to transmit the coordinate data to a display device 6 such as a personal computer or a mobile terminal, which is connected to the outside of the handwriting input device 1. The display device 6 is configured to display a handwriting 9 written on the paper sheet 7. The connection of the display device 6 is optional.

(Electronic Pen)

A configuration of the electronic pen 3 will be described using mainly FIG. 3 and FIG. 4. As illustrated in FIG. 3A and FIG. 3B, a contour of the electronic pen 3 is configured including a shaft tube 30 configured from a front shaft 30a and a rear shaft 30b, a grip 31 positioned on an outer periphery of the front shaft 30a, a cap 32 positioned ahead of the front shaft 30a (X1 side illustrated in FIG. 3B), and a click portion 33 positioned at the rear of the rear shaft 30b (X2 side in FIG. 3B).

As illustrated in FIG. 3B, a mechanical pencil unit 34 as a writing unit is arranged inside the electronic pen 3. Accordingly, as illustrated in FIG. 1, the writing can be performed on the paper sheet 7 placed on the coordinate detection surface 2a using the electronic pen 3. "Paper sheet" has a material that is not limited insofar as one on which the writing can be performed with a lead 8 of the mechanical pencil unit 34. The following describes the mechanical pencil unit 34 disposed in the electronic pen 3 in detail.

The mechanical pencil unit 34 means a whole mechanism portion that houses the lead 8 and sends out the lead 8 forward from a distal end portion 32a of the cap 32, for example, in a click method, excluding a resonance circuit 40 described later, a writing pressure detecting portion 45, the shaft tube 30 as the contour, and the grip 31 (see FIG. 4B).

Accordingly, the mechanical pencil unit 34 in the embodiment is specifically considered to be the mechanism portion from the distal end portion 32a of the cap 32 to a lead deliver portion 36 positioned inside the front shaft 30a, a lead case 37, and the click portion 33 arranged on a rear end side of the lead case 37, as illustrated in mainly FIG. 3B and FIG. 4A.

The cap 32 has a hollow and approximately cone shape. The distal end portion 32a projecting forward is formed integrally with the cap 32. A through-hole having a diameter identical to that of the lead 8 illustrated in FIG. 4B is provided on the distal end portion 32a. A diameter of a hole communicated with the through-hole gradually expands in an approximately-cone-shaped inside on the rear end side of the distal end portion 32a. Especially, on the rear end side opposed to the lead deliver portion 36, which is described later, of the cap 32, a space into which a grasping portion 360a of a chuck 360 that constitutes the lead deliver portion 36 can get is provided. As illustrated in FIG. 4A, a holding chuck 35 is disposed inside the cap 32 and on a rear end position of the distal end portion 32a. The cap 32 has a material that is not limited, but, for example, ceramic, stainless steel, and resin. The holding chuck 35 is preferably made of rubber.

The following describes the lead deliver portion 36. As illustrated in FIG. 4A, the lead deliver portion 36 is configured including the chuck 360, a fastener 361, a joint 362, and a chuck spring 363 that couples the joint 362 to the lead case 37. As illustrated in FIG. 4A, the lead deliver portion 36 is inserted into the distal end side (X1 side) of the front shaft 30a.

As illustrated in FIG. 4A, the grasping portion 360a circumferentially divided into a plurality of (for example, three) pieces is disposed on the front side (X1 side) of the chuck 360. The grasping portion 360a is, for example, fitted into the fastener 361 formed into a ring shape with brass in a state having backlash.

As illustrated in FIG. 4A, the chuck 360 is mounted slidably in an axial direction O (X1-X2 direction) inside the cylindrically-shaped joint 362 covering a forward peripheral area of the chuck 360. The joint 362 has an outer peripheral surface positioned on an inner peripheral surface of a front portion of the front shaft 30a. A cushion spring 38 couples a rear end portion of the joint 362 to an inner peripheral end portion disposed on the inner peripheral surface of the front shaft 30a, which is opposed to this rear end portion, inside the front shaft 30a.

The coiled chuck spring 363 couples the rear end portion of the joint 362 to a distal end portion of the lead case 37 inside the front shaft 30a.

With the electronic pen 3 being held with a side of the cap 32 down and the click portion 33 up, when the click portion 33 illustrated in FIG. 3 is clicked forward, the lead case 37 moves forward and the chuck spring 363 is compressed to project the chuck 360 forward. At this time, the divided grasping portion 360a of the chuck 360 opens, and the lead 8 housed in the lead case 37 drops under its own weight to pass through the chuck 360. The drop of the lead 8 under its own weight is blocked at a position of the holding chuck 35 disposed inside the cap 32. When the click portion 33 is returned to the original position, the lead case 37 returns rearward and the grasping portion 360a of the chuck 360 is fastened with the fastener 361. Thus, the lead 8 is grasped with the grasping portion 360a of the chuck 360. Repeating this click operation causes the lead 8 to repeat the forward movement ahead of the holding chuck 35 and the grasp with the grasping portion 360a little by little. Eventually, the lead 8 projects forward from the distal end portion 32a of the cap 32.

As illustrated in FIG. 4A, the electronic pen 3 in the embodiment includes the first resonance circuit 40 configured including a ferrite core 43 formed into an approximately cylindrical shape on an outer peripheral side of the front shaft 30a, a coil 41 wound around an outer periphery of the ferrite core 43, and a capacitor 42 arranged on a side of the rear shaft 30b.

The electronic pen 3 in the embodiment internally includes the writing pressure detecting portion 45. As illustrated in FIG. 4A, in the embodiment, the writing pressure detecting portion 45 is disposed on a distal end surface 30a1 on the front side (X1 side) of the front shaft 30a. As illustrated in FIG. 4A, a flange 362a disposed integratedly with the joint 362 that constitutes the lead deliver portion 36 is opposed to the front of the distal end surface 30a1 of the front shaft 30a. A stroke width S is provided between the writing pressure detecting portion 45, which is disposed on the distal end surface 30a1 of the front shaft 30a, and the flange 362a. The stroke width S is preferably 0 mm or more and 0.5 mm or less. When the stroke width S is 0 mm, the writing pressure detecting portion 45 and the flange 362a keep a constantly contact state.

FIG. 4A illustrates a non-writing state where the lead 8 is not housed in the lead case 37, or even though the lead 8 is housed in the lead case 37, the lead 8 does not project from the distal end portion 32a of the cap 32. In this non-writing state, even though the writing is performed on the paper sheet 7 illustrated in FIG. 1 using the electronic pen 3, the handwriting 9 with the lead 8 does not remain on the paper sheet 7, and the writing pressure detecting portion 45 does not act and the writing pressure is not detected.

Meanwhile, FIG. 4B illustrates a writable state where the lead 8 is projecting from the distal end portion 32a of the cap 32. In the state in FIG. 4B, the cushion spring 38 is compressed by receiving the writing pressure applied to the lead 8, and the lead deliver portion 36 retreats in the X2 direction. Thus, the writing pressure detecting portion 45 is pushed by the flange 362a to detect the writing pressure.

The writing pressure detecting portion 45, which is, for example, a pressure-sensitive sensor, receives the pressing force to change a resistance value and a capacitance. The writing pressure detecting portion 45 is incorporated as a resistor or a variable capacitor in the first resonance circuit 40. A resonance characteristic of the first resonance circuit 40 changes by receiving the writing pressure. The controller 2b of the coordinate input device 2 is configured to detect the writing pressure. For example, the antenna coil generates an induced voltage with a signal (radio wave) transmitted from the electronic pen 3 on a side of the coordinate input device 2. A coordinate value of the electronic pen 3 is calculated based on a level of a voltage value of the induced voltage. The controller 2b is configured to detect the voltage based on the signal (radio wave) transmitted from the electronic pen 3 and a signal level corresponding to a phase difference with the received radio wave.

The electronic pen 4 illustrated in FIG. 5 and FIG. 6 has a configuration partially different from that of the electronic pen 3 illustrated in FIG. 3 and FIG. 4. The electronic pen 4 in FIG. 5 and FIG. 6 has a structure referred to as a lead holder (holder type). Here, for convenience, in FIG. 5 and FIG. 6, identical reference numerals are attached to constituting members identical or similar to those in the electronic pen 3 in FIG. 3 and FIG. 4. The electronic pen 4 illustrated in FIG. 5 and FIG. 6 is applied as the electronic pen of the handwriting input device illustrated in FIG. 1 and FIG. 2.

As illustrated in FIG. 5, a contour of the electronic pen 4 is configured including the shaft tube 30 configured from the front shaft 30a and the rear shaft 30b, the grip 31 positioned on the outer periphery of the front shaft 30a, a lip member 72 positioned ahead of the front shaft 30a (X1 side illustrated in FIG. 5), and the click portion 33 positioned at the rear of the rear shaft 30b (X2 side in FIG. 5). The electronic pen 4 illustrated in FIG. 5 does not include the cap 32 including the holding chuck 35 illustrated in FIG. 3B.

The electronic pen 4 illustrated in FIG. 5 and FIG. 6 has a mechanical pencil unit 74 considered as a mechanism portion from the lip member 72, to the lead deliver portion 36, the lead case 37, and the click portion 33 arranged on the rear end side of the lead case 37.

The configuration of the lead deliver portion 36 is as described in FIG. 4A, that is, the lead deliver portion 36 is configured including the chuck 360, the fastener 361, the joint 362, and the chuck spring 363 that couples the joint 362 to the lead case 37. In the configuration illustrated in FIG. 6, the fastener 361, the joint 362, and further the flange 362a are integrally formed.

As illustrated in FIG. 6, the grasping portion 360a circumferentially divided into a plurality of pieces is disposed on the front side (X1 side) of the chuck 360, and the chuck 360 is mounted slidably in the axial direction O (X1-X2 direction) inside the joint 362. As illustrated in FIG. 6, the cushion spring 38 couples the rear end portion of the joint 362 to the inner peripheral end portion disposed on the inner peripheral surface of the front shaft 30a, which is opposed to this rear end portion, inside the front shaft 30a. The coiled chuck spring 363 couples the rear end portion of the joint 362 to the distal end portion of the lead case 37 inside the front shaft 30a.

FIG. 7 is the cross-sectional view illustrating the state where the lead is sent out by clicking the electronic pen in FIG. 5. As illustrated in FIG. 7, when the click portion 33 is clicked forward (X1), the lead case 37 moves forward and the chuck spring 363 is compressed to project the chuck 360 forward from the lip member 72. At this time, the divided grasping portion 360a of the chuck 360 opens, and the lead 8 housed in the lead case 37 drops under its own weight to pass through the chuck 360. At this time, when the click portion 33 is returned to the original position, the lead case 37 returns rearward (X2) and the grasping portion 360a of the chuck 360 is fastened with the fastener 361. Thus, as illustrated in FIG. 8, the lead 8 is grasped with the grasping portion 360a of the chuck 360.

Similarly to the electronic pen 3 illustrated in FIG. 4, the electronic pen 4 in the embodiment, as illustrated in FIG. 6, includes the first resonance circuit 40 configured including the ferrite core 43 formed into the approximately cylindrical shape on the outer peripheral side of the front shaft 30a, the coil 41 wound around the outer periphery of the ferrite core 43, and the capacitor 42 arranged on the rear shaft 30b side.

As illustrated in FIG. 6, the electronic pen 4 internally includes the writing pressure detecting portion 45. For example, the writing pressure detecting portion 45 is disposed on the distal end surface of the front shaft 30a. As illustrated in FIG. 6, the flange 362a disposed integratedly with the joint 362 that constitutes the lead deliver portion 36 is opposed to the front side (X1 side) of the writing pressure detecting portion 45. The stroke width S provided between the writing pressure detecting portion 45 and the flange 362a is referred to the description in FIG. 4.

FIG. 6 illustrates a non-writing state where the lead is not housed in the lead case 37, or even though the lead is housed in the lead case 37, the lead does not project from a distal end of the grasping portion 360a. In this non-writing state, even though the writing is performed on the paper sheet 7 illustrated in FIG. 1 using the electronic pen 4, the handwriting 9 with the lead does not remain on the paper sheet 7, and the writing pressure detecting portion 45 does not act and the writing pressure is not detected.

That is, as illustrated in FIG. 6, in the non-writing state, the grasping portion 360a is in a state approximately housed inside the lip member 72. The lip member 72 is a part that does not move even by receiving an applied pressure. Accordingly, in the non-writing state, the grasping portion 360a does not receive the applied pressure. Accordingly, the lead deliver portion 36 does not move rearward. Thus, the writing pressure detecting portion 45 is not pushed by the flange 362a. In the non-writing state, even if the grasping portion 360a is slightly projecting from the lip member 72 and the rearward movement of the lead deliver portion 36 is permitted by its projecting length, its movement distance is assumed to be a length such that the writing pressure detecting portion 45 is not pushed by the flange 362a.

Meanwhile, as illustrated in FIG. 9, in a writable state where the lead 8 is projecting from the distal end of the grasping portion 360a, the cushion spring 38 is compressed by receiving the writing pressure applied to the lead 8 to retreat the lead deliver portion 36 in the X2 direction. Thus, the writing pressure detecting portion 45 is pushed by the flange 362a to detect the writing pressure.

(Electronic Eraser)

Subsequently, the electronic eraser 5 will be described with reference to mainly FIG. 10 to FIG. 12. As illustrated in FIG. 10A, an contour of the electronic eraser 5 is configured including a pipe-shaped main body 50, an eraser 51 such as a rubber eraser inserted from the front (X1 side) of the main body 50 to be held in a state partially projecting from the front (X1 side) of the main body 50, and a tail plug 52 as a lid material of the rear (X2 side) of the main body 50. Accordingly, as illustrated in FIG. 1, the handwriting 9 written on the paper sheet 7 can be erased using the electronic eraser 5.

As illustrated in FIG. 10B, the main body 50 is configured internally including an eraser receptacle 53 positioned on the rear end side (X2 side) of the eraser 51 to hold the eraser 51, an erasing pressure detecting portion 54 held onto the distal end side of the tail plug 52, a cushion spring 55 coupled between the eraser receptacle 53 and the tail plug 52, and a second resonance circuit 56 configured including a coil 57, a capacitor 58, and a ferrite core 59. A tubular portion 53a projecting forward (X1 direction) is disposed on the eraser receptacle 53. The eraser 51 is pressed in and held into the tubular portion 53a.

The coil 57 is wound around the outer periphery of the approximately cylindrically-shaped ferrite core 59. The coil 57 and the ferrite core 59 are arranged in a clearance between the main body 50 and the tail plug 52 and between the main body 50 and the eraser receptacle 53. The capacitor 58 is, for example, held into an internal space of the tail plug 52.

In the configuration illustrated in FIG. 10B, the eraser 51, together with the eraser receptacle 53, is supported movably in the axial direction O (X1-X2). Accordingly, the eraser receptacle 53 retreats in the X2 direction together with the eraser 51 by receiving the pressing force in the X2 direction to press the erasing pressure detecting portion 54. Thus, an erasing pressure can be detected.

An electronic eraser 5 illustrated in FIG. 11 is different from that in FIG. 10 only in a rear end side shape of the eraser 51 and a shape of a holding member of the eraser 51, and other constituting members are identical to those in FIG. 10.

As illustrated in FIG. 11B, the eraser 51 has a depressed portion 51a on the rear end side. A tubular portion 61a projecting forward (X1 direction) of an eraser pedestal 61 is pressed in this depressed portion 51a. Thus, the eraser 51 is held onto the eraser pedestal 61.

The electronic erasers 5 illustrated in FIG. 10 and FIG. 11 each have a structure where the approximately cylindrically-shaped ferrite core 59 and the coil 57 are arranged on the outer peripheral side of the eraser 51. In contrast, an electronic eraser 5 illustrated in FIG. 12, unlike the structures illustrated in FIG. 10 and FIG. 11, has a structure where the eraser 51 is arranged on the outer peripheral side of the coil 57 wound around the outer periphery of the rod-shaped ferrite core 59. In the electronic eraser 5 in FIG. 12, parts having reference numerals identical to those in FIG. 10 and FIG. 11 indicate members identical to those in FIG. 10 and FIG. 11.

As illustrated in FIG. 12B, a depressed portion 60a is formed inside an eraser pedestal 60 forward from the rear end side. The ferrite core 59 and the coil 57 are disposed inside the depressed portion 60a. The rear end side of the ferrite core 59 is covered with a pedestal tail plug 60c. A projecting protrusion 60b is disposed on the front of the eraser pedestal 60. The protrusion 60b is pressed in a depressed portion formed on the rear end side of the eraser 51. Thus, the eraser 51 is held onto the eraser pedestal 60.

As illustrated in FIG. 10, FIG. 11, and FIG. 12, the erasing pressure detecting portion 54 is disposed on the electronic eraser 5. The erasing pressure detecting portion 54, which is, for example, a pressure-sensitive sensor, receives the pressing force to change the resistance value and the capacitance. The erasing pressure detecting portion 54 is incorporated as a resistor or a variable capacitor in the second resonance circuit 56. The resonance characteristic of the second resonance circuit 56 changes by receiving the erasing pressure. The controller 2b of the coordinate input device 2 is configured to detect the erasing pressure. For example, the antenna coil generates the induced voltage with the signal (radio wave) transmitted from the electronic eraser 5 on the coordinate input device 2 side. The coordinate value of the electronic eraser 5 is calculated based on the level of the voltage value of the induced voltage. The controller 2b is configured to detect the erasing pressure based on the signal (radio wave) transmitted from the electronic eraser 5 and the signal level corresponding to the phase difference with the received radio wave.

Conventionally, a content written with the electronic pen is necessary to be confirmed by display it on, for example, an external display or a personal computer. However, the embodiment can easily obtain hand-written data without connection to the external display or the like, using the paper sheet 7 in place of the display.

First Embodiment

The handwriting input device 1 in a first embodiment is a handwriting input device configured to obtain the hand-written data of the electronic pen 3, 4 on the coordinate detection surface 2a of the coordinate input device 2 by the electromagnetic induction effect between the coordinate input device 2 and the electronic pen 3, 4. The electronic pen 3, 4 includes the resonance circuit (the first resonance circuit 40) including the coil 41, the capacitor 42, and the core (the ferrite core 43), the mechanical pencil unit 34 configured to perform the writing on the paper sheet 7 placed on the coordinate detection surface 2a, and the writing pressure detecting portion 45 configured to detect the writing pressure such that a part of the mechanical pencil unit 34 is pushed by receiving the writing pressure applied to the lead 8 projecting from the distal end of the mechanical pencil unit 34. Then, the detection of the writing pressure causes the coordinate input device 2 to obtain the hand-written data corresponding to the handwriting on the paper sheet 7 while the writing is performed on the paper sheet 7 with the electronic pen 3, 4. In the first embodiment, the coordinate input device 2 and the electronic pen 3 are required constituting members, but the electronic eraser 5 is selectable and may be absent.

That is, in the first embodiment, in order to reduce the incorrect input such that the hand-written data is obtained on the coordinate input device 2 side though the writing is not performed on the paper sheet 7, the writing pressure applied to the lead 8 is detected, and the coordinate input device 2 obtains the hand-written data (the coordinate data) of the electronic pen 3 when the writing pressure is detected. Meanwhile, the hand-written data is not obtained when the writing pressure is not detected.

The embodiment does not have a configuration where the whole mechanical pencil unit 34 is pushed by receiving the writing pressure. The whole mechanical pencil unit 34 is a unit including all from the nib from which the lead 8 is delivered outside (the distal end portion 32a of the cap 32 in FIG. 3 and FIG. 4, and the grasping portion 360a of the chuck 360 and the lip member 72 in FIG. 5 and FIG. 6) to the click portion 33. In the case of the configuration where the whole mechanical pencil unit 34 is pushed by receiving the writing pressure, the writing pressure is detected when the nib is pushed. Thus, the writing pressure is detected even in a state where the lead 8 does not project from the distal end. Precisely, the inventions described in Patent Document 1 and Patent Document 2 have a configuration where the whole writing unit is pushed by receiving the writing pressure, thus detecting the writing pressure even in the state where the lead 8 does not project from the distal end.

In contrast, the embodiment has a configuration where only a part of the mechanical pencil unit 34 moves when receiving the writing pressure applied to the lead 8, not the whole mechanical pencil unit 34. That is, the distal end portion 32a (see FIG. 3 and FIG. 4) of the cap 32 or the lip member 72 (see FIG. 5 and FIG. 6) that constitutes the mechanical pencil unit 34 does not move even by being pushed, and the lead deliver portion 36 positioned inside the electronic pen 3, 4 moves. Accordingly, in FIG. 4A or FIG. 6 where the lead does not project from the distal end of the cap 32 or the lip member 72, even if the distal end portion 32a or the lip member 72 is pressed, the lead deliver portion 36 does not retreat or has a small amount of retreat. Thus, the writing pressure detecting portion 45 is not pushed by the flange 362a. Accordingly, the writing pressure detecting portion 45 does not act and does not detect the writing pressure.

Meanwhile, as in FIG. 4B, in the state where the lead 8 is projecting from the distal end portion 32a, the lead deliver portion 36 grasping the lead 8 retreats by receiving the writing pressure applied to the lead 8, and the writing pressure detecting portion 45 acts such that the writing pressure detecting portion 45 is pushed by the flange 362a. FIG. 4B illustrates the state where the writing pressure detecting portion 45 is pushed such that the lead deliver portion 36 retreats. Also in the embodiment illustrated in FIG. 6, in the state where the lead is projecting from the distal end of the grasping portion 360a, the lead deliver portion 36 retreats by receiving the writing pressure applied to the lead 8, and the writing pressure detecting portion 45 acts such that the writing pressure detecting portion 45 is pushed by the flange 362a (see FIG. 9).

As illustrated in FIG. 4A, in the configuration having the predetermined stroke width S between the flange 362a and the writing pressure detecting portion 45, for example, after the flange 362a contacts the writing pressure detecting portion 45, the writing pressure detecting portion 45 can be put in action, but may be put in action in the middle of the stroke. It is also possible to have a configuration where, making a state where the flange 362a constantly contacts the writing pressure detecting portion 45, the writing pressure detecting portion 45 is pushed after the writing pressure detecting portion 45 is put in action. In FIG. 4, the writing pressure detecting portion 45 is arranged on the distal end surface 30a1 of the front shaft 30a. However, the writing pressure detecting portion 45 may be arranged on a rear end surface of the flange 362a opposed to the distal end surface 30a1 of the front shaft 30a. The stroke width S and the arrangement of the writing pressure detecting portion 45 are also applicable to the embodiment illustrated in FIG. 5 and FIG. 6.

Thus, in the embodiment, when the writing pressure applied to the lead 8 is detected, the coordinate input device 2 obtains the hand-written data of the electronic pen 3, 4. Thus, the hand-written data corresponding to the handwriting can be obtained simultaneously with the writing on the paper sheet 7 with the electronic pen 3, 4. In view of this, the embodiment can obtain paper data and the hand-written data obtained by the coordinate input device 2 simultaneously and having a good consistency.

As described above, the first embodiment has the configuration where, when the lead 8 projecting from the distal end of the mechanical pencil unit 34 is pressed with the writing pressure, a part of the mechanical pencil unit 34, together with the lead 8, receives the pressing force, and the writing pressure detecting portion 45 detects the writing pressure. Thus, a part of the mechanical pencil unit 34 receives the pressing force while the lead 8 is projecting from the distal end. In the state where the lead 8 does not project from the distal end, a part of the mechanical pencil unit 34 does not receive the pressing force. Thus, the writing pressure is not detected. Accordingly, the first embodiment can reduce the incorrect input such that the hand-written data is obtained on the coordinate input device 2 side though the writing is not performed on the paper sheet to improve the consistency between the handwriting written on the paper sheet and the hand-written data obtained by the coordinate input device 2.

The embodiment may have a configuration to perform only detection of presence/absence of the writing pressure. When it is a configuration configured to detect a magnitude of the writing pressure, magnitude information of the writing pressure is also taken in the hand-written data to ensure a process to thicken a line displayed on the display device 6 when the writing pressure is large, thus ensuring record of the hand-written data closer to the handwriting.

The embodiment preferably has a configuration where the writing pressure detection is performed on a front part of the mechanical pencil unit 34. This can satisfy responsiveness in the writing pressure detection.

In the embodiment illustrated in FIG. 3 and FIG. 4, the lead deliver portion 36 positioned at the rear of the distal end portion 32a is disposed capable of advancing and retreating inside the electronic pen 3 independently from the distal end portion 32a. The lead deliver portion 36, when receiving the writing pressure in the state where the lead 8 is projecting from the distal end of the mechanical pencil unit 34, retreats in the axial direction O together with the lead 8. Then, the writing pressure detecting portion 45 acts in response to the movement of the lead deliver portion 36 with the writing pressure. This causes the lead deliver portion 36 not to move inside the electronic pen 3 even by receiving the writing pressure in the state where the lead 8 does not project from the distal end portion 32a of the cap 32. Accordingly, the writing pressure is not detected in the state where the lead 8 does not project, thus ensuring preventing the coordinate input device 2 from obtaining the hand-written data. Meanwhile, in the state where the lead 8 is projecting from the distal end portion 32a of the mechanical pencil unit 34, the lead deliver portion 36 can move inside the electronic pen 3 by receiving the writing pressure. This can cause the writing pressure detecting portion 45 to act to appropriately obtain the hand-written data while the writing is performed on the paper sheet 7.

In the embodiment illustrated in FIG. 5 and FIG. 6, the lead deliver portion 36 capable of advancing and retreating is arranged inside the lip member 72. In the writing state where the lead is projecting from the grasping portion 360a, the lead deliver portion 36 moves to act the writing pressure detecting portion 45. Meanwhile, in the non-writing state, the lead deliver portion 36 does not move inside the electronic pen 4 even by receiving the writing pressure of the lead. Alternatively, even when the lead deliver portion 36 moves, its movement amount is considerably small. Thus, in the writing state, the writing pressure detecting portion 45 can act to appropriately obtain the hand-written data while the writing is performed on the paper sheet 7. Meanwhile, in the non-writing state, the writing pressure is not detected, thus ensuring preventing the coordinate input device 2 from obtaining the hand-written data.

The pipe-shaped shaft tube 30 is fixedly arranged inside the electronic pen 3. As illustrated in FIG. 4, a part of the lead deliver portion 36 is inserted into the distal end side of the front shaft 30a that constitutes the shaft tube 30. The flange 362a opposed to the distal end surface 30a1 is disposed ahead of the distal end surface 30a1 of the front shaft 30a on the lead deliver portion 36. The writing pressure detecting portion 45 is disposed on one of the flange 362a and the distal end surface 30a1. The writing pressure detecting portion 45 is pushed by the distal end surface 30a1 or the flange 362a to detect the writing pressure. This ensures the writing pressure detection with the lead deliver portion 36, using the shaft tube 30 fixed inside the electronic pen 3, accurately and with a simple configuration. The same applies to the electronic pen 4 in the embodiment illustrated in FIG. 6.

A buffer is preferably arranged on a part of a peripheral area of the lead deliver portion 36. For example, the buffer can be interposed into a clearance between the lead deliver portion 36 and the front shaft 30a and a space A between the flange 362a and the cap 32 illustrated in FIG. 4B. As the buffer, for example, grease can be exemplified. Alternatively, the buffer may be one including a mechanical damper mechanism. Also in the embodiment illustrated in FIG. 6, the buffer can be interposed into, for example, a clearance between the flange 362a and the lip member 72.

The arrangement of the buffer can reduce occurrence of abnormal noise based on the advancing and retreating movement of the lead deliver portion 36. The arrangement of the buffer also can have a slight resistance so that the lead deliver portion 36 does not rapidly advance and retreat depending on the presence/absence of the writing pressure. This can make the writing with the electronic pen 3, 4 comfortable.

The movement amount (the stroke width S illustrated in FIG. 4A and FIG. 6) of the lead deliver portion 36 with the writing pressure is preferably 0 mm or more and 0.5 mm or less. Thus, shortening the movement amount can make the writing with the electronic pen 3, 4 comfortable. A low writing pressure can be also detected.

In the embodiment, the writing pressure detecting portion 45 can be configured from a pressure-sensitive sensor. Thus, the use of the pressure-sensitive sensor can configure a thin-type sensor to be appropriately arranged inside the electronic pen 3, 4. The use of the pressure-sensitive sensor can enhance a pressure sensitivity to detect the writing pressure with high accuracy.

As illustrated in FIG. 1, in the coordinate input device 2, a sensor (not illustrated) configured to detect the presence/absence of the paper sheet 7 is mounted on a fixing portion (for example, paper holder) 10 that fixes the paper sheet 7 onto the coordinate detection surface 2a. In view of this, when it is detected that the paper sheet 7 is not set on the coordinate detection surface 2a at the fixing portion 10, the coordinate input device 2 can control not to obtain the hand-written data of the electronic pen 3, 4. Thus, even if the writing is performed in the state where the paper sheet 7 is not set on the coordinate detection surface 2a, obtaining the hand-written data of the electronic pen 3, 4 is stopped. Thus, the state without the paper sheet 7 can be appropriately reduced as the incorrect input.

As illustrated in FIG. 1, positional-deviation detecting portions 11 that detect whether the paper sheet 7 has been arranged at a predetermined position on the coordinate detection surface 2a or not are disposed on the coordinate input device 2. When the positional-deviation detecting portion 11 determines that the paper sheet 7 is not arranged at the predetermined position, obtaining the hand-written data of the electronic pen 3, 4 is stopped. Installation positions and the number of the positional-deviation detecting portions 11 are not limited, but a plurality of positional-deviation detecting portions 11 are preferably arranged at corners of the coordinate detection surface 2a. For example, as illustrated in FIG. 1, the positional-deviation detecting portions 11 are arranged at four corners of the coordinate detection surface 2a. This enables the positional-deviation detecting portion 11 to determine that the positional deviation has occurred when the position of the paper sheet 7 is arranged displaced off the coordinate detection surface 2a and the paper sheet 7 does not overlap at least one positional-deviation detecting portion 11 among the plurality of positional-deviation detecting portions 11. Thus, even if the writing is made in the state where the positional deviation of the paper sheet 7 has occurred, obtaining the hand-written data of the electronic pen 3, 4 is stopped. Thus, the state where the positional deviation of the paper sheet 7 has occurred can be appropriately reduced as the incorrect input.

As the sensor arranged on the fixing portion 10 and the positional-deviation detecting portion 11, an infrared sensor, an illuminance sensor, a touch sensor, and the like can be selected. It is also possible to have a configuration configured to notify the user with sound, light, and the like in the case without the paper sheet 7 and when the positional deviation of the paper sheet 7 has occurred.

Second Embodiment

In a second embodiment, the handwriting input device 1 has a configuration including further the electronic eraser 5 besides the coordinate input device 2 and the electronic pen 3, 4.

Here, conventionally, when the handwriting written on the paper sheet is erased with the rubber eraser, the hand-written data of the electronic pen remains in the coordinate input device. Accordingly, the hand-written data in the coordinate input device has to be differently deleted. When only a part of the handwriting on the paper sheet is erased, the hand-written data cannot be deleted in accordance with it. Thus, it is impossible to simultaneously perform the erasure of the handwriting on the paper sheet and the deletion of the hand-written data corresponding to it. The inventions described in Patent Document 1 and Patent Document 2 do not disclose a deleting method of the handwriting written on the paper sheet and the hand-written data of the electronic pen corresponding to it.

The second embodiment has been made in consideration of such a problem, and one of its objectives is to provide a handwriting input device that can simultaneously perform erasure of handwriting written on a paper sheet and deletion control of hand-written data.

That is, the handwriting input device in the second embodiment includes the electronic pen 3, 4, the electronic eraser 5, and the coordinate input device 2. The electronic pen 3, 4 includes the mechanical pencil unit 34 that ensures the writing on the paper sheet 7, and the first resonance circuit 40 including the coil 41, the capacitor 42, and the core (ferrite core 43). The electronic eraser 5 includes the eraser 51 configured to erase the handwriting written on the paper sheet 7 and the second resonance circuit 56 including the coil 57, the capacitor 58, and the core (ferrite core 59). The coordinate input device 2 includes the coordinate detection surface 2a on which the paper sheet 7 can be placed. The coordinate input device 2 is configured to identify the electronic pen 3, 4 and the electronic eraser 5 on the coordinate detection surface 2a by the electromagnetic induction effect. The coordinate input device 2 obtains the hand-written data corresponding to the handwriting written on the paper sheet 7 with the electronic pen 3, 4. And, while the electronic eraser 5 erases the handwriting written on the paper sheet 7, the hand-written data corresponding to the erased handwriting is controlled to be deleted.

At this time, it is possible to differentiate a resonance frequency by an electromagnetic induction acting between the electronic pen 3, 4 including the first resonance circuit 40 and the coordinate input device 2 from a resonance frequency by an electromagnetic induction acting between the electronic eraser 5 including the second resonance circuit 56 and the coordinate input device 2. Accordingly, it is possible to appropriately identify respective coordinate data of the electronic pen 3, 4 and the electronic eraser 5 on the coordinate detection surface 2a.

The electronic eraser 5 in the embodiment includes the eraser 51 configured to erase the handwriting 9 written on the paper sheet 7. Accordingly, as illustrated in FIG. 1, it is possible, at the same time when the electronic eraser 5 erases the handwriting 9 on the paper sheet 7, to control deleting the hand-written data recorded in the recorder 2c corresponding to the erased handwriting 9 based on the coordinate data (deletion data) of the electronic eraser 5 obtained by the coordinate input device 2.

This simultaneously ensures the erasure of the handwriting 9 written on the paper sheet 7 and the deletion control of the hand-written data corresponding to it. Here, "the deletion control of the hand-written data" includes, when the controller 2b obtains the hand-written data with the electronic pen 3, 4 and the deletion data with the electronic eraser 5, to delete data overlapping the deletion data from the hand-written data recorded in the recorder 2c for rerecording and, for example, to record the hand-written data and the deletion data divided into hierarchies to make a state where the transmitter 2d can transmit the respective hand-written data and deletion data. That is, a state where the hand-written data is not deleted as data to be left so as to correspond to the erased handwriting 9 when display it on the display device 6 is also included in the state where the deletion control has been performed on the hand-written data.

In the embodiment, the electronic eraser 5 internally includes the erasing pressure detecting portion 54 configured to detect the erasing pressure. In the configurations in FIG. 10, FIG. 11, and FIG. 12, when the eraser 51 is pushed, the eraser 51 retreats to act the erasing pressure detecting portion 54, thus detecting the erasing pressure. Then, in the embodiment, the detection of the erasing pressure can control to delete the hand-written data recorded in the recorder 2c. The handwriting 9 written on the paper sheet cannot be appropriately erased without a certain amount of erasing pressure. In view of this, the control to delete the hand-written data when the erasing pressure is detected enables the erasure of the handwriting 9 written on the paper sheet 7 to match the deletion of the hand-written data corresponding to it more.

In the embodiment, the erasing pressure detecting portion 54 may control to perform only the detection of the presence/absence of the erasing pressure. However, in a configuration configured to detect the magnitude of the erasing pressure, taking in the magnitude information of the erasing pressure ensures data processing such that an erasing width relative to the handwriting increases when the erasing pressure is large.

In the embodiment, the erasing pressure detecting portion 54 can be configured from a pressure-sensitive sensor. The use of the pressure-sensitive sensor can configure a thin-type sensor to be appropriately arranged inside the electronic eraser 5. The use of the pressure-sensitive sensor can enhance the pressure sensitivity to detect the erasing pressure with high accuracy.

In a positional relationship between the eraser 51, and the coil 57 and the ferrite core 59 inside the electronic eraser 5, as illustrated in FIG. 10 and FIG. 11, the coil 57 and the ferrite core 59 may be arranged on the outer periphery on the rear end side of the eraser 51, or as illustrated in FIG. 12, the eraser 51 may be arranged from the outer peripheries on the front end sides of the coil 57 and the ferrite core 59 to the front of the coil 57 and the ferrite core 59. This can compactly arrange the coil 57 and the ferrite core 59, and the eraser 51 inside the electronic eraser 5 in a simple configuration. In the embodiment, the coil 57 and the eraser 51 can be closely arranged to minimally reduce the positional deviation between the coil 57 and the eraser 51. Accordingly, this can decrease the deviation between the data on an erasing position obtained on the coordinate input device 2 side and an erased position by the eraser 51 on the paper sheet 7. In view of this, it is possible to more improve the consistency between the erasure of the handwriting 9 written on the paper sheet 7 and the deletion of the hand-written data corresponding to it.

In the embodiment, the eraser 51 has a diameter that is preferably 5 mm or less. When the eraser 51 has a shape other than the circular shape, the diameter of the eraser 51 means the largest diameter. Setting the diameter of the eraser 51 to 5 mm or less can more decrease the positional deviation between the coil 57 and the eraser 51. Accordingly, it is possible to more improve the consistency between the erasure of the handwriting 9 written on the paper sheet 7 and the deletion of the hand-written data corresponding to it.

The erasers 51 illustrated in FIG. 10, FIG. 11, and FIG. 12 each have a configuration held onto the eraser receptacle 53 and the eraser pedestals 60 and 61 by press-in, and the erasers 51 can be exchanged as necessary. Thus, the electronic eraser 5 can be used by exchanging only the part of the eraser 51, thus being economical. Shape deformation of the eraser 51 by the use may change the resonance characteristic by the electromagnetic induction with the coordinate input device 2. Accordingly, exchanging the eraser 51 as necessary can improve the consistency between the erasure of the paper data and the deletion of the hand-written data.

In the embodiment, the eraser 51 is preferably formed of a material that keeps the distance with the coil 57 approximately constant. For example, an absorbent porous body such as a basic calcium carbonate porous body can be selected as the material of the eraser 51. This can surely erase the handwriting 9 with the lead 8 of the mechanical pencil unit 34 and can ensure the eraser 51 without eraser shavings (without weight change). Thus, the erasing work with the eraser 51 can also keep the shape of the eraser 51 approximately constant. Thus, the distance with the coil 57 can be kept approximately constant. In view of this, without the change of the resonance characteristic by the electromagnetic induction with the coordinate input device 2, the consistency between the paper data and the hand-written data can be more improved.

The present invention is not limited to the above-described embodiments and can be implemented with various changes. In the above-described embodiments, the size, the shape, and the like illustrated in the attached drawings are not limited to them and can be changed as necessary in a range to provide the effects of invention. Additionally, present invention can be implemented with changes as necessary without departing from a range of the object of the present invention.

For example, the electronic pen 3, 4 and the electronic eraser 5 can be simultaneously used. For example, it is possible to exemplify a way to use that a certain user performs the writing on the paper sheet with the electronic pen 3, 4, while another user erases the handwriting 9 written on the paper sheet with the electronic eraser 5. For example, the electronic pen 3, 4 and the electronic eraser 5 may be integrated such that the electronic eraser 5 is disposed on a tail portion of the electronic pen 3, 4.

For example, the recorder 2c can make a record by adding time information such that a clock portion is disposed on the coordinate input device 2 in the block diagram illustrated in FIG. 2. For example, fine data save is ensured such that the hand-written data and the deletion data of the electronic eraser 5 are recorded hierarchically divided into times.

This application is based on Japanese Patent Application No. 2016-171892 filed on 2 Sep. 2016, Japanese Patent Application No. 2016-171893 filed on 2 Sep. 2016, and Japanese Patent Application No. 2016-246405 filed on 20 Dec. 2016. All the contents are included therein.

The invention claimed is:
1. A handwriting input device comprising:
an electronic pen; and
a coordinate detection surface configured to obtain handwritten data of the electronic pen by an electromagnetic induction effect between the coordinate detection surface and the electronic pen, wherein the electronic pen comprises:
- a resonance circuit including a coil, a capacitor, and a core;
- a mechanical pencil unit configured to perform writing on a paper sheet placed on the coordinate detection surface; and
- a writing pressure detecting portion configured to detect a writing pressure such that a part of the mechanical pencil unit is pushed by receiving the writing pressure applied to a lead projecting from a distal end of the mechanical pencil unit, wherein the detection of the writing pressure causes the coordinate input device to obtain the hand-written data corresponding to a handwriting on the paper sheet while writing is performed on the paper sheet with the electronic pen, wherein the electronic pen internally includes a lead deliver portion configured to advance and retreat, wherein the lead deliver portion is configured to deliver the lead from the distal end of the mechanical pencil unit, wherein the lead deliver portion is configured to axially retreat together with the lead by receiving the writing pressure in a state where the lead is projecting from the distal end of the mechanical pencil unit, wherein the writing pressure detecting portion operates in response to a movement of the lead deliver portion with the writing pressure, and wherein when the electronic pen is in a non-writing state, in which a lead is either not accommodated in the mechanical pencil unit of the lead is projecting from the distal end of the mechanical pencil unit while the lead is accommodated therein, the lead deliver portion does not advance or retreat and the writing pressure detecting portion does not operate even if pressure is applied on the distal end.

2. The handwriting input device according to claim 1, wherein
the electronic pen internally and fixedly arranges a pipe shaped shaft tube, the lead deliver portion is inserted into a distal end side of the shaft tube, the lead deliver portion includes a flange opposed to a distal end surface of the shaft tube ahead of the distal end surface, the writing pressure detecting portion is disposed on one of the flange and the distal end surface, and the writing pressure detecting portion is pushed by the distal end surface or the flange to detect the writing pressure.

3. The handwriting input device according to claim 1, wherein
a buffer is arranged on a part of a peripheral area of the lead deliver portion.

4. The handwriting input device according to claim 1, wherein
the lead deliver portion has a movement amount with the writing pressure, and the movement amount is 0 mm or more and 0.5 mm or less.

5. The hand input device according to claim 1, wherein
the writing pressure detecting portion is configured from a pressure-sensitive sensor.

6. The handwriting input device according to claim 1, wherein
the coordinate input device includes a fixing portion that fixes the paper sheet onto the coordinate detection surface, a presence/absence of the paper sheet is detectable on the fixing portion, and obtaining of the hand-written data is stopped when the paper sheet is determined to be absent.

7. The handwriting input device according to claim 1, wherein
the coordinate input device includes a positional-deviation detecting portion that detects whether the paper sheet is arranged at a predetermined position on the coordinate detection surface or not, and obtaining of the hand-written data is stopped when the positional-deviation detecting portion determines that the paper sheet is not arranged on the predetermined position.

* * * * *